United States Patent Office 3,489,048
Patented Jan. 13, 1970

3,489,048
DEVICE FOR CUTTING WRAPPERS OR BINDERS
Bo Sandqvist, Norrviken, Sweden, assignor to Arenco Aktiebolag, Stockholm-Vallingby, Sweden
Filed Nov. 24, 1967, Ser. No. 685,432
Claims priority, application Sweden, Dec. 1, 1966, 16,451/66
Int. Cl. B26d 1/02
U.S. Cl. 83—512                                       1 Claim

ABSTRACT OF THE DISCLOSURE

A device for cutting wrappers or binders and comprising at least one cutting blade, a number of cutting rollers mounted in a holder, an arm supporting said holder, said arm being movable between an upper position and a lower position in which latter position the rollers engage said blade and said holder being displaceably mounted relative to said arm in the transverse direction of the rollers.

---

The present invention relates to a device for cutting wrappers or binders and which is provided with at least one cutting blade situated in a cutting bed and a number of cutting rollers which are mounted in a holder attached to a movable arm and which are capable of moving over the blade in contact with the same.

In known devices of this type the arm is usually mounted at the side of the cutting bed, in the extension of the longitudinal axis of the knife, and adapted to impart to the cutting rollers a reciprocating movement over the knife, for the purpose of cutting out a wrapper or binder. One disadvantage associated with such apparatus is that the arm requires a lot of space and, furthermore, the cutting operation takes a relatively long time to accomplish.

The object of the present invention is to provide a device by means of which these disadvantages are eliminated. According to the invention this has been realised in that the arm is movably mounted in a plane perpendicular to the plane of the cutting blade and is connected to a drive means, adapted to move the arm alternately between an upper and a lower position, in which latter position the cutting rollers are in contact with the knife; in addition to which the holder is displaceably mounted on the arm in the transverse direction of the cutting rollers under the actuation of a reciprocating drive mechanism. The invention enables the arm to be positioned on either side of the cutting bed and the said arm needs only the minimum of space since the swinging movement of said arm is effected solely in the vertical plane. The cutting operation can be effected with great rapidity since subsequent to each cutting operation the arm together with the holder need only be swung upwards through a comparatively short distance to allow a fresh tobacco leaf to be placed on the cutting bed. Further it is possible by means of the apparatus according to the invention to shorten the cutting time still further, by allowing the cutting rollers during a cutting operation to roll along the blade in one direction only and not effect a return movement during the same cutting operation. A particular advantage gained by the apparatus according to the invention is that by providing the holder with a plurality of cutting rollers arranged one behind the other in the cutting direction and adapted to roll along different portions of the knife so that the path of one roller overlaps the path of adjacent rollers the length of stroke of the holder drive mechanism can be made considerably shorter than the extension of the knife in the cutting direction.

Figure 1:
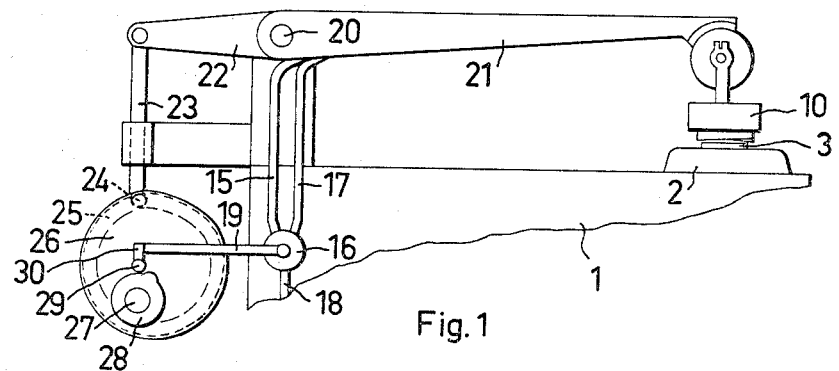
Figure 2:
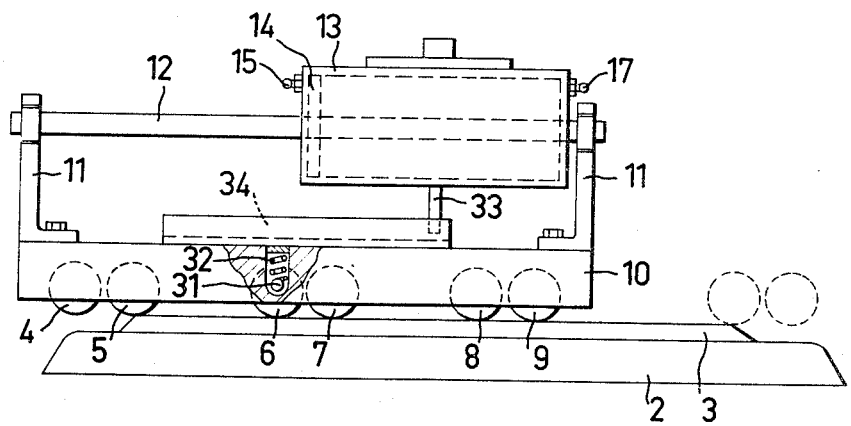

The invention will now be more closely described with reference to the accompanying, diagrammatic drawing, in which
FIGURE 1 shows, as an example, an embodiment of the invention seen from the side, and
FIGURE 2 shows the same apparatus seen from the front.

The shown apparatus presents a frame 1 in which a cutting bed 2 provided with a cutting blade 3 is mounted. A number of conical cutting rollers 4–9 of a known type are mounted for free rotation in a holder 10, which is secured to the ends of a piston rod 12 by means of brackets 11; the said piston rod being slidably mounted in a double-acting pneumatic cylinder 13 and extends out through openings in the end walls of said cylinder 13. The cylinder space on one side of the piston 14 of the cylinder is connected, by means of a conduit 15, to a valve 16 and the cylinder space on the opposite side of said piston 14 is connected, by means of a second conduit 17, to the valve 16. The valve is connected to a compressed air line 18 and is so designed that the piston 14 and the rod 12 can be caused to adopt two end positions corresponding to two positions of adjustment of an operating arm 19. Further, the cylinder 13 is secured to an arm 21 pivotally mounted about a horizontal pivot 20. The arm 21 is secured to an actuator arm 22 which is pivotally connected with a displaceably mounted rod 23, the free end of which presents a roller 24 which runs in a groove 25 of a rotary disc cam 26 securely mounted to a shaft 27. The shaft 27 bears a further disc cam 28 on which rolls a cam follower roller 29 which is freely rotatably mounted on a rod 30 which is securely connected to the pivotally mounted actuator arm 19 of the valve 16.

The arrangement is shown in the drawing in its working position, wherein the holder 10 with the cutting rollers 4–9, which are rotatably mounted on shafts 31 and the ends of which shafts are resiliently mounted against the action of compression springs 32 in the holder 10, has just been lowered onto the blade 3 by swinging arm 21 downwards by means of the disc cam 26. The piston rod 12 is in its one end position, the cutting roller 4 being situated outside the blade 3. Upon further rotation of the shaft 27 the roller 29 is lifted by a cam on the disc cam 28 so that the valve 16 is switched over and moves the piston rod 12, and thereby the holder 10, to the opposite end position in which the cutting roller 9 is located outside the blade 3, as indicated in the drawing by dash lines. During this movement a wrapper or binder is cut out of a tobacco leaf (not shown) positioned on the cutting bed 2. Immediately after this operation the valve 16 is returned to its original starting position by the disc cam 28, the holder 10 being returned to the position shown on the drawing; whereafter the arm 21 is swung up by the disc cam 26 so that the tobacco leaf can be moved in over the blade 3 or, if desired, a new tobacco leaf can be placed on the cutting bed 2.

To prevent revolving of the piston rod 12 the cylinder 13 is provided with an outwardly projecting guide stud 33, which cooperates with a groove 34 arranged on the top of the holder 10.

In the shown arrangement the six cutting rollers 4–9 are placed in pairs behind one another in the holder 10. The requisite stroke length of the cylinder is thus equal to the sum of one third the length of blade 3, the distance between the cutting rollers in one pair, e.g., rollers 4, 5, and the required degree of overlapping. Of course a shorter stroke length can be obtained if the holder is provided with more pairs of cutting rollers. Similarly the time taken to effect a cutting operation can be further reduced if the disc cams 26 and 28 are designed so that the cutting rollers 4–9 are lifted from the blade after having rolled along the same in one direction. The return movement can be adapted to take place after a new tobacco leaf has been placed on the knife and the cutting rollers lowered into engagement therewith, or with the cutting rollers in raised position.

Further modifications are conceivable within the scope of the inventive idea. Thus, the arm 21 may be directed vertically and be mounted displaceably in an axial direction for lifting and lowering the holder 10.

What is claimed is:

1. A device for cutting wrappers or binders comprising a cutting bed, at least one cutting blade positioned in said cutting bed, a number of cutting rollers mounted in a holder, an arm supporting said holder, said arm being mounted movable in a plane perpendicular to the plane of the cutting blade between an upper position and a lower position in which the cutting rollers are positioned in contact with said cutting blade, drive means adapted to move said arm between said positions, a pressure fluid cylinder securely mounted on said arm and having end walls, a piston rod positioned in said cylinder in parallel with said cutting blade and having end portions projecting out through said end walls, means to securely attach said holder to said piston rod, and means to impart to said piston rod a reciprocating movement in its longitudinal direction.

References Cited

UNITED STATES PATENTS

| | | | |
|---|---|---|---|
| 1,129,876 | 3/1915 | Latham | 83—510 |
| 1,188,541 | 6/1916 | Hansen | 83—512 |
| 2,320,393 | 6/1943 | Randolph | 83—512 |
| 2,957,379 | 10/1960 | Sidebotham et al. | 83—512 X |
| 3,060,775 | 10/1962 | Dreher | 83—510 X |

JAMES M. MEISTER, Primary Examiner

U.S. Cl. X.R.

83—564